US010283293B2

(12) United States Patent
Ullermann et al.

(10) Patent No.: US 10,283,293 B2
(45) Date of Patent: May 7, 2019

(54) THERMAL CIRCUIT BREAKER

(71) Applicant: Ellenberger & Poensgen GmbH, Altdorf (DE)

(72) Inventors: Wolfgang Ullermann, Schwabach (DE); Ewald Schneider, Offenhausen (DE); Dietmar Koops, Nuremberg (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 287 days.

(21) Appl. No.: 15/271,539

(22) Filed: Sep. 21, 2016

(65) Prior Publication Data
US 2017/0011877 A1 Jan. 12, 2017

Related U.S. Application Data

(63) Continuation of application No. PCT/EP2015/000437, filed on Feb. 26, 2015.

(30) Foreign Application Priority Data

Mar. 21, 2014 (DE) .......................... 10 2014 004 106

(51) Int. Cl.
*H01H 37/04* (2006.01)
*H01H 37/34* (2006.01)
(Continued)

(52) U.S. Cl.
CPC ............ *H01H 37/04* (2013.01); *B60R 16/03* (2013.01); *H01H 37/34* (2013.01); *H01H 37/52* (2013.01);
(Continued)

(58) Field of Classification Search
CPC .... H01H 37/04; H01H 37/5427; H01H 37/34; H01H 37/52; H01H 2235/01; B60R 16/03
(Continued)

(56) References Cited

U.S. PATENT DOCUMENTS 2,727,116 A * 12/1955 Alfred .................... H01H 37/04
200/302.1
3,537,052 A   10/1970 Snider
(Continued)

FOREIGN PATENT DOCUMENTS

CN    201689827 U    12/2010
CN    103081051 A    5/2013
(Continued)

*Primary Examiner* — Anatoly Vortman
(74) *Attorney, Agent, or Firm* — Muncy, Geissler, Olds & Lowe, P.C.

(57) ABSTRACT

A thermally activated safety switch for safeguarding a consumer of a power supply network of a vehicle, having a switch housing in a temperature-independent switching unit, which subject to the temperature thereof establishes an electrically conductive connection between two external terminals fed out of the switch housing, wherein the external terminals are fed out at opposite housing sides of the switch housing. On the one hand, the external terminals are provided for an electrical and mechanical terminal connection to the cable connection ends of a consumer to be protected, and on the other hand to a cable portion leading to an on-board power supply electronics, and are configured accordingly.

17 Claims, 6 Drawing Sheets

(51) Int. Cl.
    *B60R 16/03* (2006.01)
    *H01H 37/52* (2006.01)
    *H01H 37/54* (2006.01)
(52) U.S. Cl.
    CPC ..... *H01H 37/5427* (2013.01); *H01H 2235/01* (2013.01)
(58) Field of Classification Search
    USPC .......................................... 337/381
    See application file for complete search history.

(56) References Cited

U.S. PATENT DOCUMENTS

| | | | | |
|---|---|---|---|---|
| 3,609,620 | A * | 9/1971 | Lee | H01H 61/02 337/102 |
| 3,827,013 | A * | 7/1974 | Kowalski | H01H 37/54 337/112 |
| 3,913,054 | A * | 10/1975 | Wolfe | H01H 37/68 29/464 |
| 4,358,667 | A * | 11/1982 | Johnson | H05B 3/82 219/508 |
| 4,380,001 | A * | 4/1983 | Kasamatsu | H01H 85/0241 337/4 |
| 4,490,704 | A * | 12/1984 | Snider | H01H 61/02 337/112 |
| 4,626,820 | A * | 12/1986 | Takahashi | H01H 37/5427 174/549 |
| 4,876,523 | A | 10/1989 | Kushida et al. | |
| 5,337,036 | A | 8/1994 | Kuczynski | |
| 5,489,762 | A | 2/1996 | Martin et al. | |
| 5,880,665 | A * | 3/1999 | Yetter | H01H 85/201 337/187 |
| 6,064,295 | A * | 5/2000 | Becher | H01H 37/5427 337/342 |
| 8,289,124 | B2 | 10/2012 | Hofsaess | |
| 2003/0122650 | A1* | 7/2003 | Yamamoto | H01H 37/5427 337/333 |
| 2005/0057336 | A1* | 3/2005 | Toyosaki | H01H 1/60 337/85 |
| 2010/0066478 | A1 | 3/2010 | Hofsaess | |
| 2010/0149698 | A1 | 6/2010 | Torella et al. | |
| 2013/0214895 | A1* | 8/2013 | Ullermann | H01H 37/5409 337/377 |
| 2014/0111299 | A1 | 4/2014 | Takeda | |
| 2014/0285308 | A1* | 9/2014 | Namikawa | H01H 37/54 337/1 |
| 2016/0035521 | A1* | 2/2016 | Namikawa | H01H 37/5427 337/380 |
| 2018/0233310 | A1* | 8/2018 | Tanaka | H01H 37/52 |

FOREIGN PATENT DOCUMENTS

| | | |
|---|---|---|
| CN | 103597566 A | 2/2014 |
| DE | 298 06 869 U1 | 6/1998 |
| DE | 198 52 578 C1 | 4/2000 |
| DE | 10 2005 001 371 A1 | 7/2006 |
| DE | 10 2008 048 554 B3 | 2/2010 |
| DE | 20 2009 010 473 U1 | 4/2010 |
| DE | 102009053258 B3 | 5/2011 |
| EP | 0 800 193 A2 | 10/1997 |
| EP | 0938116 A2 | 8/1999 |
| FR | 1362441 A1 | 6/1964 |
| JP | H07-326268 | 12/1995 |
| JP | H 09-134634 A | 5/1997 |
| WO | WO 2012/037991 A1 | 3/2012 |

\* cited by examiner

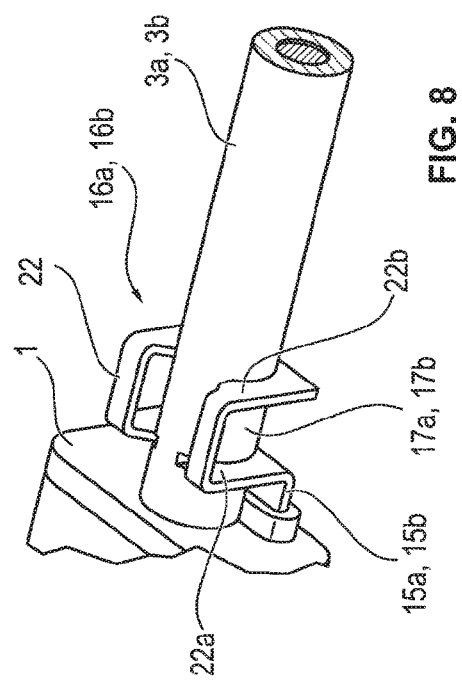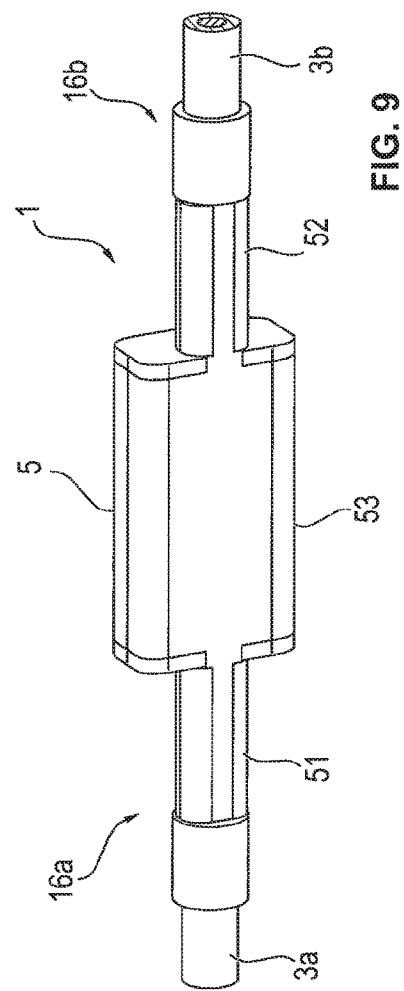

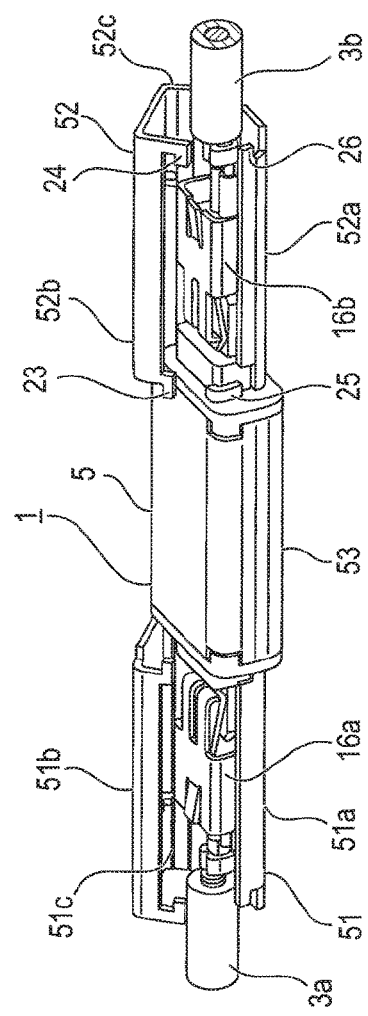
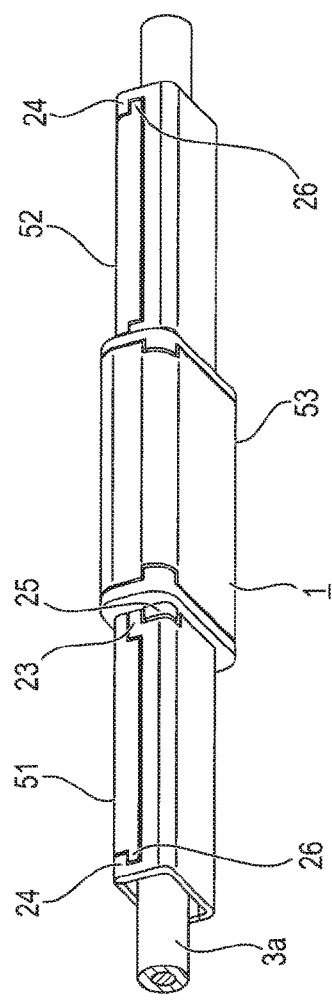
FIG. 10
FIG. 11

THERMAL CIRCUIT BREAKER

This nonprovisional application is a continuation of International Application No. PCT/EP2015/000437, which was filed on Feb. 26, 2015, and which claims priority to German Patent Application No. 10 2014 004 106.9, which was filed in Germany on Mar. 21, 2014, and which are both herein incorporated by reference.

BACKGROUND OF THE INVENTION

Field of the Invention

The invention relates to a thermally actuated circuit breaker for protecting a load, in particular a vehicle power supply, also known as an onboard electrical system, comprising in a switch housing a temperature-dependent switching mechanism, which subject to its temperature establishes an electrically conductive connection between two external terminals positioned on opposite sides of the housing and fed out of the switch housing.

Description of the Background Art

From US 2005/0057336 A1, a thermally actuated circuit breaker for protecting electrical components against excess current, having a switch housing and a temperature-dependent switching mechanism disposed therein, is known, which produces as a function of its temperature an electrically conductive connection between two external terminals leading out of the switch housing, which are fed out on opposite sides of the housing.

The protection of a power supply having vehicle loads supplied by a power supply, especially a passenger car or a commercial vehicle, particularly a truck or a bus, is usually carried out by means of fuses, circuit breakers or relays, which are arranged centrally in a fuse box of an onboard electronics, also designated as a central electrical system, with corresponding slots. This requires the laying or routing of cables or lines from the protected loads, which can be located virtually at any location within the vehicle, to the onboard electronics. Hereinafter, a single-lead or multicore composite of cores coated with an insulating material will be referred to as a cable, which serves to transfer energy, in particular, nominal or load current supplied to the respective load.

The laying of the cable or conductors and the cable/conductive material itself represent not only a cost factor, but also lead to a corresponding increase in vehicle weight. This in turn is undesirable, especially in view of the desired reduction in emissions of such vehicles in respect of optimizing the carbon footprint.

The circuit breaker used to-date to protect the power supply or onboard electrical system and/or for overcurrent protection of loads is inserted in sockets of an onboard electronics or into the vehicle control unit, wherein the sockets serve on the one hand to (mechanically) fix the circuit breakers and on the other hand, to (electrically) contact these to the respective cable. Usually, in the automobile sector, thermally actuated, self-resetting miniature circuit breakers using a bimetal switching mechanism in conjunction with a PTC resistor as the heating element for holding open the switch contacts are used when tripping occurs, such as those known, for example, from DE 20 2009 010 473 U1 and WO 2012/037991 A1.

In order to fix the circuit breakers on the cable or conductor cores, spring contacts are crimped, which in turn are inserted into the socket and lock in place there. The respective circuit breaker contacts these spring contacts by means of its plug-in connections. The socket also serves to electrically insulate this connection and must be separately attached, for example, clipped, into the cable or the cable harness.

SUMMARY OF THE INVENTION

It is therefore an object of the invention to provide a thermally actuated circuit breaker that is particularly suitable for a vehicle electrical system and can be particularly suitably integrated into the system.

In a thermally actuated circuit breaker used to protect a load of a vehicle power system in a switch housing with a temperature-dependent switching mechanism, which depending on the temperature thereof establishes an electrically conductive connection between two external terminals fed out of the switch housing, according to the invention the external terminals are fed out on opposite housing sides of the switch housing as well as provided and configured for an electrical and mechanical terminal connection with the cable connection ends of in each case one cable portion, of which one cable portion leads to a load being protected, and the other cable portion leads to an onboard electronics system. The switch housing of the particularly advantageously integratable circuit breaker has a plurality of housing sections, wherein a middle housing section surrounds the switch-specific switching mechanism, whereas there, housing sections connected thereto on both sides are used for receiving the respective terminal connection.

The term "onboard electronics" can be, for example, a vehicle control unit or an onboard power supply of such a vehicle. Furthermore, the term "cable" can be, for example, a single conductor with conductor insulation encasing a conductor core, or a number of such conductors that are encased by a common cable insulation.

In an exemplary embodiment, the invention is based on the consideration of moving the protection of the respective load as closely as possible to the load. Since such protection can practically be located anywhere on the vehicle, e.g. also at an inaccessible locations, the circuit breaker according to an embodiment can be self-resetting.

In an embodiment, the switching mechanism has a bimetal element supporting a moving contact at its free end, and a heating element in the form of preferably a PTC resistor, which rests on the bimetal element and is supported by means of a spring element on a fixed contact arm. Together with the moving contact, a fixed contact supported by the fixed contact arm forms the switch contact point of the circuit breaker.

In this regard, according to the SAE standard J553, one can generally make use of two types of devices, in which the device, i.e. the circuit breaker, automatically closes (type I) after a specified time after a power interruption due to an overcurrent. In this case, operation is ordinarily based on the cooling of a bimetal upon opening, which then again closes the circuit. A device (circuit breaker) of the type II holds the circuit in an open state until the (supply) voltage is removed, wherein for the thermal tripping after the opening process, a bimetal is maintained at temperature by a heating element so that the thermally actuated circuit breaker may initiate the closing operation only after it has been switched off, that is, after removal of the voltage.

The circuit breaker can be of the type II, using a PTC resistor as a heating element for keeping the circuit open. It is advantageous here, in particular, that on the one hand, the temperature in case of overload remains in a range enabling the use of a switch housing consisting of a plastic, and that on the other hand, overheating in the cable (harness) in which the circuit breaker is integrated according to the invention is avoided. Moreover, the inventive circuit breaker integrated in the assembled state in a cable, in particular in a power supply cable of a vehicle, is a miniature construction or design. These are understood to be housing dimensions of the switch housing with lengths of about 10 mm to 25 mm, widths of about 5 mm to 10 mm and heights of about 15 mm to 25 mm. Here, a rectangular switch housing with terminals fed out at the narrow sides that oppose each other in the housing longitudinal direction is particularly suitable and preferred.

Suitably, the terminal connections of the circuit breaker with the cable ends and the conductor cores guided therein are designed as connections without screws. Suitable here are clamp connections or also insulation displacement connections. Designing the external terminals of the circuit breaker as an insulation displacement contact (IDC) saves the assembly step of stripping the cable or the conductor cores. By utilizing double-edged insulation displacement contacts, it is possible to use both cutting edges for the electrical contact, or to design one of the blades as strain relief.

While the external terminals of the circuit breaker can also be designed as spring contacts or double spring contacts, crimp connections are particularly advantageous. In this regard, further savings is possible when the respective external terminal of the circuit breaker is directly designed as a blade receptacle with a molded crimp shaft. In addition to the core or wire crimp chamfers, this crimp shaft has strain relief chamfers at its free end, which during the crimping process enclose the cable or conductor insulation, which are thereby deformed due to the pressing process up to a, usually predetermined, extent.

The design of the thermally actuated circuit breaker for its integration into a cable, in particular a power supply cable of a vehicle, further allows, in addition to the aforementioned, preferably screwless connection variants, designing the external terminals as spring-loaded terminals, for example, in the manner of a so-called cage clamp spring. The advantage of such spring-loaded terminals is on the one hand their easy handling in the terminal connection of the stripped cable or conductor end, and on the other hand, their reliable electrical and mechanical connection contact. Particularly when using a spring or cage clamp spring as a connecting element, it is possible to easily manually loosen the connection.

Basically, it is also possible to directly weld the connection of the circuit breaker with the cable ends or their conductor cores in the area of the external terminals of the circuit breaker, for example, using ultrasonic welding.

The terminal-side housing sections are suitably formed from a, e.g., shell-like housing lower part and a, e.g., also shell-like housing upper part that closes the housing lower part. Particularly expediently, the respective housing upper shell is pivotally connected to the corresponding housing lower part of the connection-side housing section. Especially suitable is the formation of a film hinge between the housing upper part and the housing lower part, particularly since the switch housing or its housing sections are expediently made of a plastic that is suitable in particular as regards the best possible insulation properties and high heat resistance, in particular during the spraying process.

The terminal-side housing sections directly join the middle housing section of the switch housing, for example, designed in one piece. The closing of the terminal-side housing sections taking place following the connection contact of the cable ends with the circuit breaker-side external terminals suitably occurs by latching connections between the housing upper part and the housing lower part on the housing side opposite the hinge or film hinge connection.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 8 shows the connector configuration as a double-edged insulation displacement contact, FIG. 9 is a perspective view of the circuit breaker integrated in the cable with a switch housing formed by three housing sections, FIG. 10 is a perspective view of the cable-integrated circuit breaker with open terminal-side housing sections and a closed middle housing section, FIG. 11 shows the arrangement of FIG. 10 with closed terminal-side housing sections.

DETAILED DESCRIPTION

Figure 1:
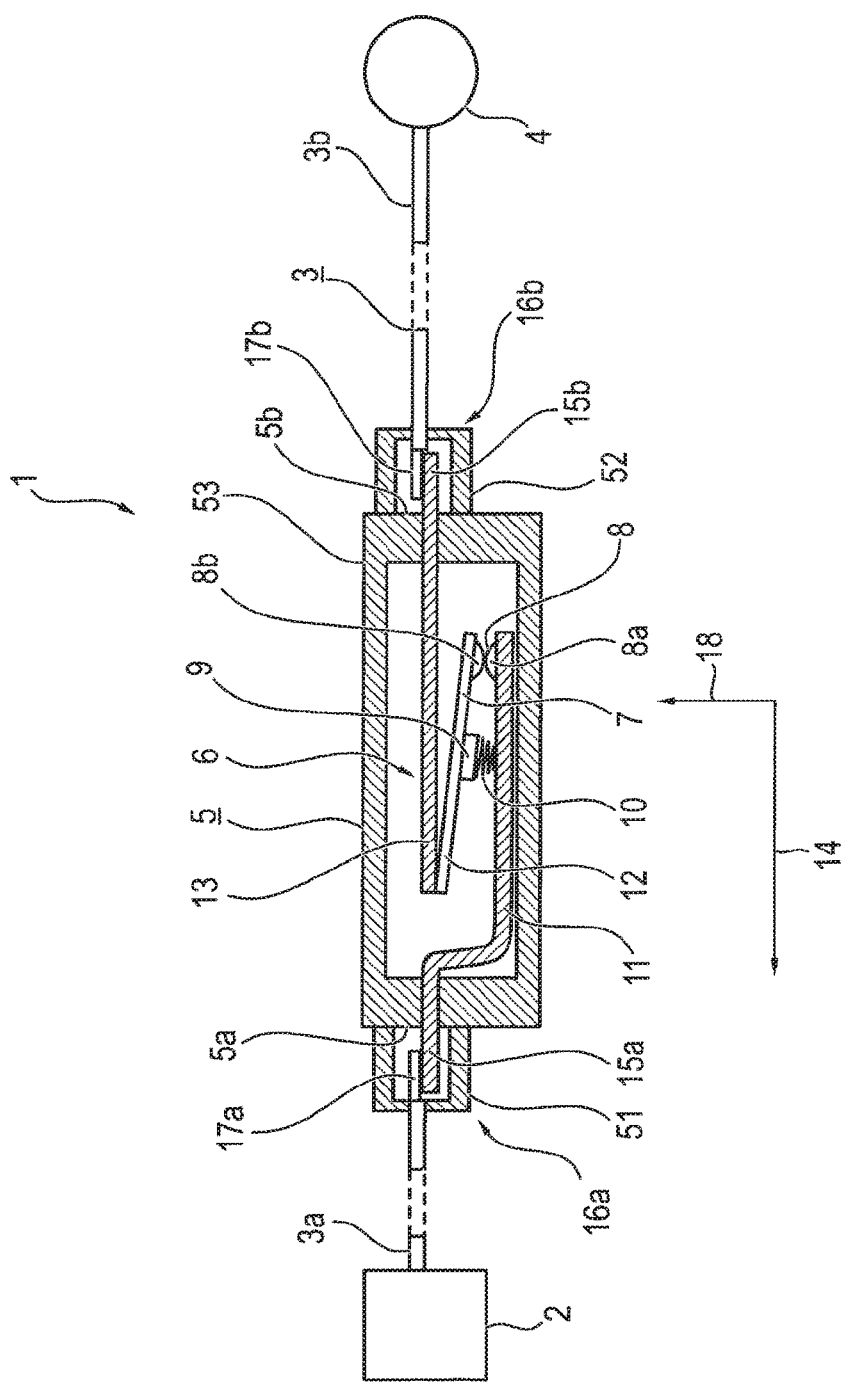
FIG. 1 is a schematic longitudinal section of a thermally actuated circuit breaker with a thermally actuated switch mechanism and with external terminals diametrically extending in the switch longitudinal direction in their contact connection with cable connection ends (cable ends) from cable portions leading on the one side to onboard electronics and on the other, to a load.

FIG. 1 schematically shows a cable-integratable, thermally actuated circuit breaker 1 in its electrically contacted and mechanical connection, with a (first) cable portion 3a leading to an onboard electronics 2 of a motor vehicle, and a second cable portion 3*b* of an onboard power supply cable or cable harness 3 leading to an electrical load or an electric load 4. The first cable portion 3*a* is hereinafter referred to as the control or supply-side cable portion and the second cable portion 3*b* is called the user or load-side cable portion.

The load 4 may be, for example, an electric motor driven actuator or other conventional electrical load of a vehicle (car, truck).

The thermal, i.e., thermally actuated circuit breaker 1 includes a switch housing 5 which is suitably designed in as flat a construction as possible. The thus miniaturized circuit breaker 1 is suitably designed to be self-resetting and for this purpose, within the housing includes a switching mechanism 6 with a, for example, strip-shaped bimetal element 7 and a switch contact point 8 and a heating element 9 in the form of a PTC resistor which rests on the bimetal element 7 and is supported by a spring element 10 on a fixed contact arm 11 that supports a fixed contact 8*a* on its free end. The bimetal 7 supports a movable contact 8*b* on its free end, which, together with the fixed contactor 8*a*, forms the contact point 8 of the circuit breaker 1 shown in the closed position. The bimetal element 7 is electrically and mechanically connected with a movable contact arm 13 by its bimetallic end 12 situated opposite the contact point 8.

The fixed contact arm 11 and the movable contact arm 13 are designed as flat contacts as well as suitably power rail-like, and for this purpose, expediently designed as a stamped bent part. The contact arms 11 and 13 are fed out from the switch housing 5 on the end side in the housing longitudinal direction 14 on opposite narrow housing sides 5*a* and 5*b* and there, form the external terminals 15*a*, 15*b*. These are provided and arranged for electrical and mechanical connections 16*a* and 16*b*, with cable ends 17*a*, 17*b* of the supply-side cable portion 3*a* and the load-side cable portion 3*b*. The connections 16*a*, 16*b* are suitably situated in terminal-side housing sections 51 and 52 of, for example, a middle housing section 53, in particular, as a plastic injection molded part.

The operation of the thermal circuit breaker 1 corresponds practically to that of a thermally actuated circuit breaker known per se from WO 2012/037991 A1, in which in case of an overcurrent, the breaker flows through the bimetal element 7 in the closed position of the contact point 8 and flexes the element as a result of its deflection in the tripping direction 18. Thereby, the movable contact 8*b* is lifted from the fixed contact 8*a* and thereby pivoted in the direction of the movable contact arm 13. The current interruption thus caused, that is, the interruption of the circuit closed via the contact point 8 in the closed state of the contacts 8*a*, 8*b* of the contact point, would result in a cooling of the bimetal element 7 and, consequently, lead to a reclosing of the contact point 8. To prevent this, the suitably high-impedance-designed heating element 9 is also electrically connected to the power rail-like contact arms 11, 13 when the contact point 8 is open and thus energized. Due to the resulting heat build-up, a cooling of the bimetal element 7 adequate for renewed closing of the contact point 8 is avoided. The spring element 10 serves substantially to apply a sufficient pressing force of the heating element 9 designed as a PTC resistor to the bimetal element 7.

Figure 2:
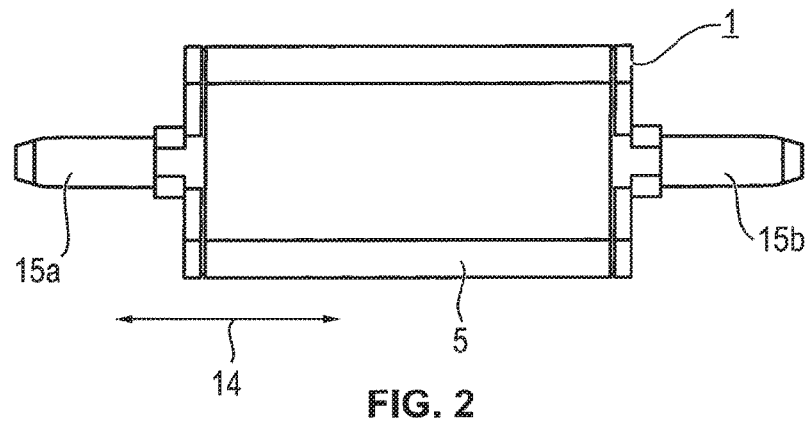
FIG. 2 shows the thermal circuit breaker integratable into a cable according to FIG. 1, in a flat and miniature design with its diametrical external terminals in plan view.

FIG. 2 also shows the circuit breaker 1 in a plan view, with external terminals 15*a* and 15*b* diametrically extending in the longitudinal direction of the switch 14. The terminal connection 16*a*, 16*b* of the circuit breaker 1 with the cable portions 3*a* and 3*b* of the cable 3 or with its cable ends 17*a*, 17*b*—and in this respect with its cable or conductor cores—is suitably carried out without screws. For this purpose, several variants of suitable terminal connections are exemplified in FIGS. 3 to 8.

Figure 3:
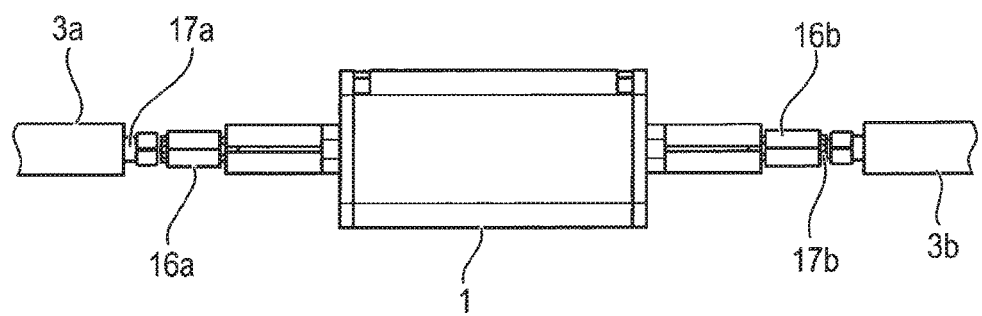
FIG. 3 is a representation according to FIG. 2, the circuit breaker with a terminal connection of the cable ends designed as a crimp connection.
Figure 4:
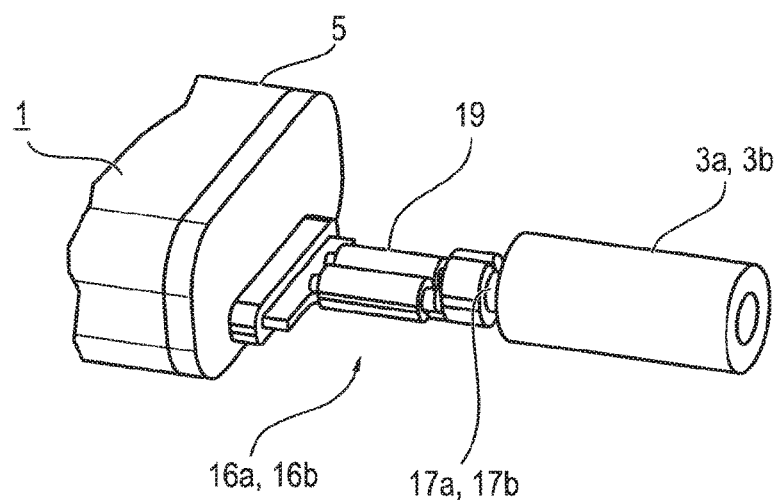
FIG. 4 is a partial perspective view of one of the external terminals of the circuit breaker in its configuration as a direct crimp connection.

In the embodiments according to FIGS. 3 and 4, the connections 16*a*, 16*b* between the external terminals 15*a*, 15*b* of the circuit breaker 1 and the cable connection ends 17*a* and 17*b* are designed as crimp connections. In the embodiment of FIG. 4, a corresponding crimp sleeve 19 is suitably already mounted directly contacting the respective external terminal 15*a*, 15*b* of the circuit breaker 1. Also, the respective external terminal 15*a*, 15*b* may already be designed as such a crimp sleeve 19.

Figure 5:
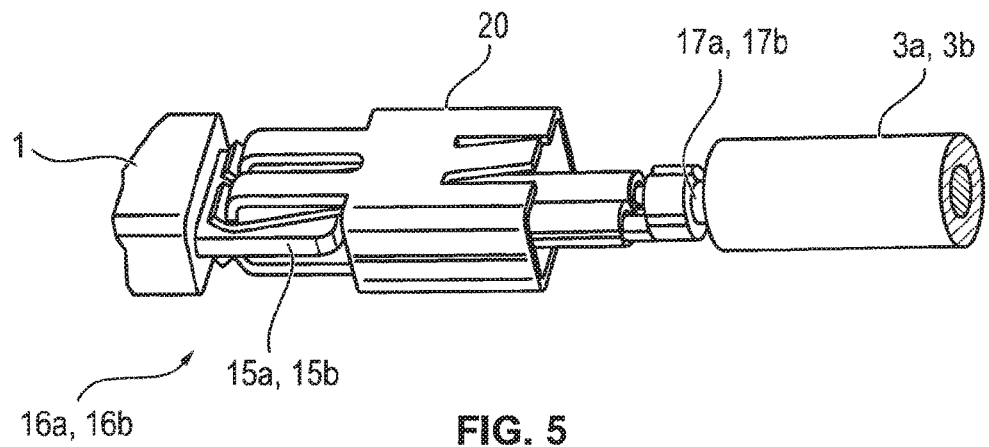
FIG. 5 is a representation according to FIG. 4 of the connector configuration as a spring contact.

In the embodiment of FIG. 5, the respective terminal connection 16*a*, 16*b* is designed as a double spring contact with a corresponding spring terminal 20, which is in turn suitably connected mechanically and electrically conductive by means of a crimp connection to the corresponding cable end 3*a*, 3*b*.

Figure 6:
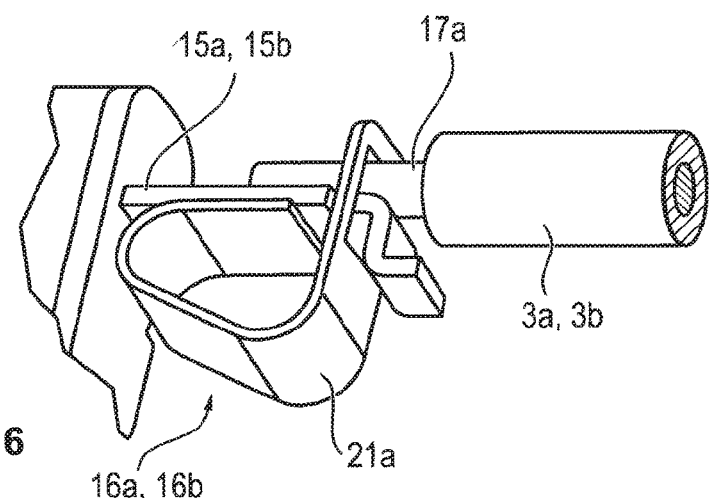
FIG. 6 shows the connector configuration as a cage clamp spring.
Figure 7:
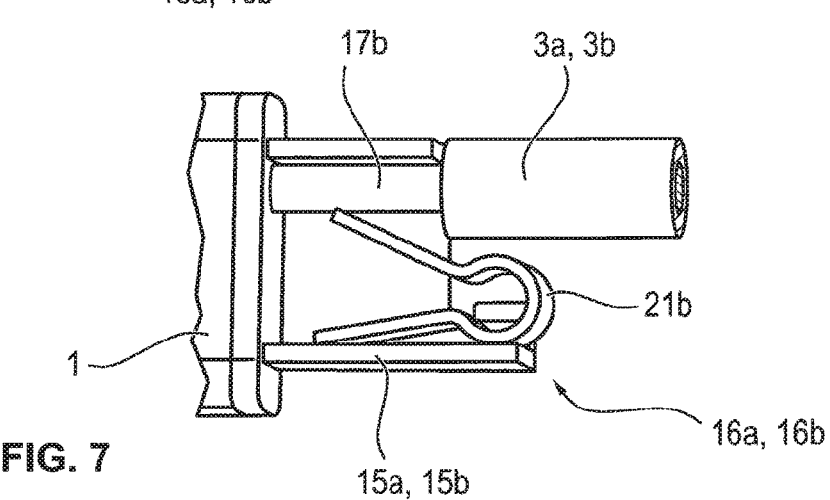
FIG. 7 shows the connector configuration as a spring-loaded terminal.

FIGS. 6 and 7 show terminal connections 16*a*, 16*b* designed as spring-loaded terminals, wherein in the embodiment of FIG. 6, a cage clamp spring 21*a* is provided, and in the embodiment of FIG. 7, a so-called push-in spring 21*b* is provided. Relatively clearly visible in FIGS. 6 and 7 are the stripped conductor cores of the cable ends 17*a*, 17*b* of the cable portions 3*a* and 3*b*.

FIG. 8 shows a connection variant of the connections 16*a*, 16*b* with a double-edged IDC 22. In this case, both blades 22*a*, 22*b* of the insulation displacement contact 22 for making electrical contact, or one of the two cutting edges 22*a*, 22*b*, can serve as a pure strain relief.

FIGS. 9 to 11 show embodiments of the switch housing 5 of the thermal circuit breaker 1 formed by the terminal-side housing sections 51 and 52 and the middle housing section 53. In the embodiment of FIG. 9, the terminal-side housing sections 51, 52 are designed as closed housing parts, in which the switch-side external terminals 15*a*, 15*b* are arranged and the connections 16*a*, 16*b* are made with the cable ends 17*a* and 17*b*, respectively.

The embodiments of FIGS. 10 and 11 show two-piece, terminal-side housing sections 51, 52 in the open or closed state with housing lower parts 51 a, 52*a* firmly attached to the middle housing section 53 of the switch housing 5 and with a housing upper part 51*b* and 52*b* hinged thereto via a film hinge 51*c*, 52*c*. In the embodiment shown, the connections 16*a*, 16*b* are constructed as double spring contacts according to the variant of FIG. 5.

Locking elements 23, 24 are molded at the housing upper parts 51*b*, 52*b* of the terminal-side housing sections 51, 52, which engage in corresponding latching elements 25 and 26 molded on each housing part 51*a*, 52*a* by forming undercuts.

Figure 12:
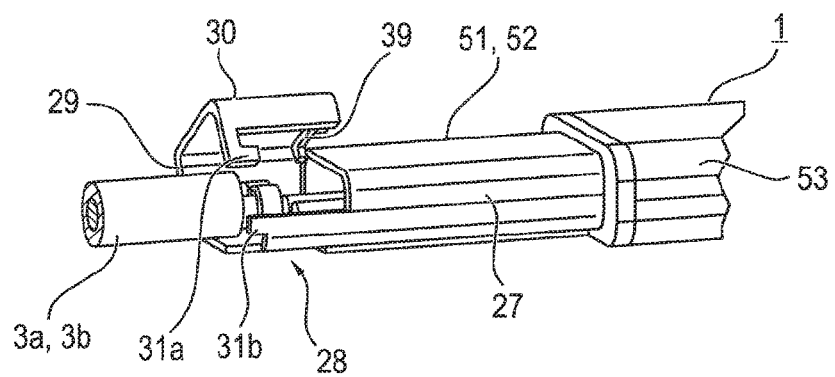
FIG. 12 shows an excerpt of one of the terminal-side housing sections according to a variant with a closed and an open housing section.
Figure 13:
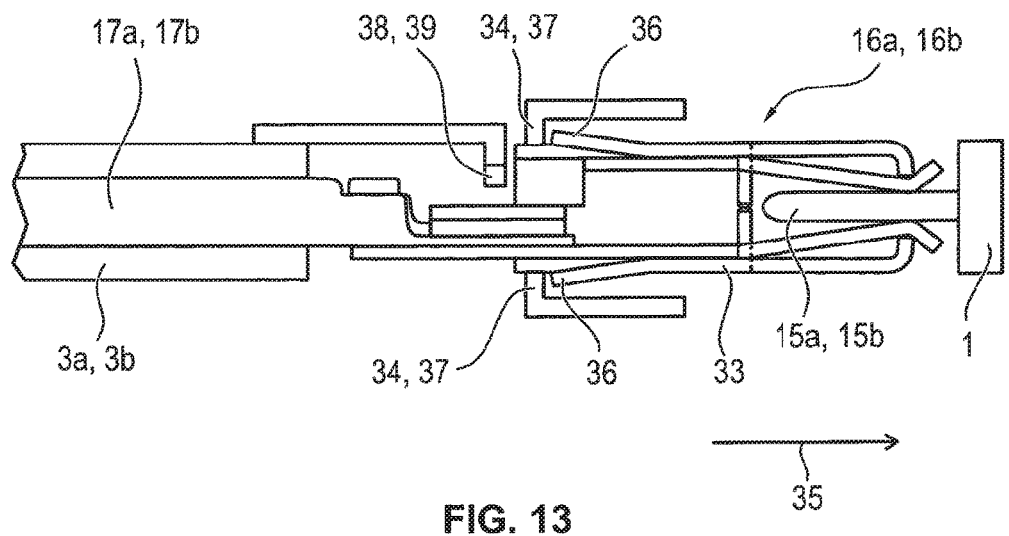
FIG. 13 shows the terminal-side housing structure according to FIG. 12 in longitudinal section with primary engagement of the cable end and having a secondary lock for strain relief when the housing part is closed.

In a perspective view and in a longitudinal section, FIGS. 12 and 13 show a terminal-side housing section 51, 52 divided in the adjacent region with a closed housing section 27 and a closable housing section 28, which in turn has a cover part 30 articulated via a film hinge 29. Cable-side locking elements 31*a*, 31*b* on the cover part 30 and on a bottom-side housing section area 32 in turn enable a reliable closing of the open housing section 28 by means of a locking connection in which the cover-side locking element 31 a undercuts the housing-side locking element 31*b*.

As can be relatively clearly seen in FIG. 13, in the embodiment, the terminal connection 16*a*, 16*b* is in turn designed as a double spring contact. When the cover part 30 is still open, the terminal connection 16*a*, 16*b* is produced by plugging on or plugging in a corresponding spring contact 33 on the respective external terminal 15*a*, 15*b*. The terminal connection 16*a*, 16*b* is thereby fixed by a primary engagement 34 in that spring tongues 36 of the spring contact 33 placed in the plug-in direction 35 engage behind housing-side locking contours 37. Additionally, a secondary lock 38 is provided for strain relief of the respective cable portion 3a, 3b. This is formed on the cover part (cover-side housing part) 30 by a corresponding locking contour 39 (FIG. 12) that is molded inwardly to the respective terminal connection 16a, 16b on the inside of the cover.

Due to the practically streamlined geometry and the relatively small mass of the thermal circuit breaker 1, it is possible to integrate the breaker without a separate attachment directly in the cable harness or in the onboard power supply cable 3 in an electrically contacting and mechanically reliable manner, firmly fastened, and thus integrate it in the cable 3 in a particularly space-saving manner.

The invention is not limited to the embodiments described above. Rather, other variations of the invention can be derived therefrom by those skilled in the art without departing from the scope of the invention. In particular, further, all single features described in connection with the embodiments can be combined in other ways without departing from the scope of the invention.

For example, the terminal connections 16a, 16b with the two external terminals 15a and 15b of the thermal circuit breaker 1 may be designed as different, screwless plug connections in accordance with the variations in FIGS. 3 to 8. Also, only one of the terminal-side housing sections 51, 52 of the switch housing 5 may be designed closable (FIG. 10) or partially closeable (FIG. 12) whereas the opposite terminal-side housing section 52 or 51 may be designed closed. Furthermore, the supply-side terminal connection 16a and/or the load-side terminal connection 16b may be designed as a welded connection.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermally actuated circuit breaker for protecting a load, the thermally actuated circuit breaker comprising:
   a switch housing formed as one integral piece, comprising:
      a middle housing section; and
      terminal-side housing sections arranged at two sides of the middle housing section;
   a temperature-dependent switching mechanism arranged in the switch housing that subject to a temperature establishes an electrically conductive connection between two external terminals positioned on opposite sides of the switch housing and fed out of the middle housing section of the switch housing;
   wherein the middle housing section surrounds the temperature-dependent switching mechanism,
   wherein the middle housing section and the terminal-side housing sections have separate housing chambers,
   wherein the terminal-side housing sections are configured to receive respective terminal connections of the two external terminals, and
   wherein the two external terminals are configured to connect electrically and mechanically with cable connection ends of a cable portion leading to a load of a vehicle power supply system to be protected and a cable portion leading to onboard electronics.

2. The thermally actuated circuit breaker according to claim 1, wherein the two external terminals are fed out of the middle housing section of the switch housing on housing narrow sides situated opposite to each other in a housing longitudinal direction.

3. The thermally actuated circuit breaker according to claim 1, wherein the respective terminal connections are constructed as screwless connections with the cable connection ends.

4. The thermally actuated circuit breaker according to claim 1, wherein the respective terminal connections are constructed as crimp connections for crimped connections of the cable connection ends.

5. The thermally actuated circuit breaker according to claim 1, wherein each of the terminal-side housing sections is formed of a housing lower part and a housing upper part closing the housing lower part.

6. The thermally actuated circuit breaker according to claim 5, wherein the upper housing part of the each of the terminal-side housing sections is rotatably articulated in via a film hinge to the housing lower part.

7. The thermally actuated circuit breaker according to claim 1, wherein each of the terminal-side housing sections provides a primary engagement of the respective terminal connections.

8. The thermally actuated circuit breaker according to claim 1, wherein each of the terminal-side housing sections provides a secondary lock of the respective terminal connections for strain relief of respective cable portions.

9. The thermally actuated circuit breaker according to claim 1, wherein the switching mechanism has a bimetal element supporting a movable contact on a free end of the bimetal element and a first switch contact point and a heating element in a form of a PTC resistor, which bears against the bimetal element and is supported by a spring element on a fixed contact arm, which supports a fixed contact that forms a second switch contact point together with the movable contact.

10. The thermally actuated circuit breaker according to claim 1, wherein the thermally actuated circuit breaker is integrated in a vehicle power supply cable of a vehicle electrical system for protecting a load of a vehicle power supply, and
   wherein the two external terminals are electrically and mechanically connected with a supply and electronics-side cable end and with a user or load-side cable end.

11. The thermally actuated circuit breaker according to claim 1, wherein the respective terminal connections are constructed as spring contacts configured to connect the cable connection ends with the two external terminals.

12. The thermally actuated circuit breaker according to claim 1, wherein the respective terminal connections are constructed as double spring contacts configured to connect the cable connection ends with the two external terminals.

13. The thermally actuated circuit breaker according to claim 1, wherein the respective terminal connections are constructed as cage clamp spring contacts configured to connect the cable connection ends with the two external terminals.

14. The thermally actuated circuit breaker according to claim 1, wherein the respective terminal connections are constructed as push-in spring contacts configured to connect the cable connection ends with the two external terminals.

15. The thermally actuated circuit breaker according to claim 1, wherein the two external terminals and the cable connection ends are directly welded together using ultrasonic welding.

16. The thermally actuated circuit breaker according to claim 1, wherein each of the terminal-side housing sections comprises a first subsection and a second subsection, and
wherein the second subsection comprises a cover part that is configured to open and close.

17. A device, comprising:
a first housing;
a second housing arranged on a first side of the first housing;
a third housing arranged on a second side opposite to the first side of the first housing, the first housing, the second housing and the third housing being formed as one integral piece with separate housing chambers;
a first external terminal arranged in the second housing;
a second external terminal arranged in the third housing; and
a switching mechanism arranged in the first housing, comprising:
a spring element;
a heating element coupled to the spring element;
a bimetal element coupled to the heating element;
a first contact coupled to the bimetal element; and
a second contact coupled to the spring element,
wherein the first external terminal is coupled to the first contact and the second external terminal is coupled to the second contact.

\* \* \* \* \*